(No Model.) 3 Sheets—Sheet 1.
E. T. STARR.
APPARATUS FOR PRODUCING SIGNALS AND LIGHTS UPON RAILWAY TRAINS.
No. 253,442. Patented Feb. 7, 1882.
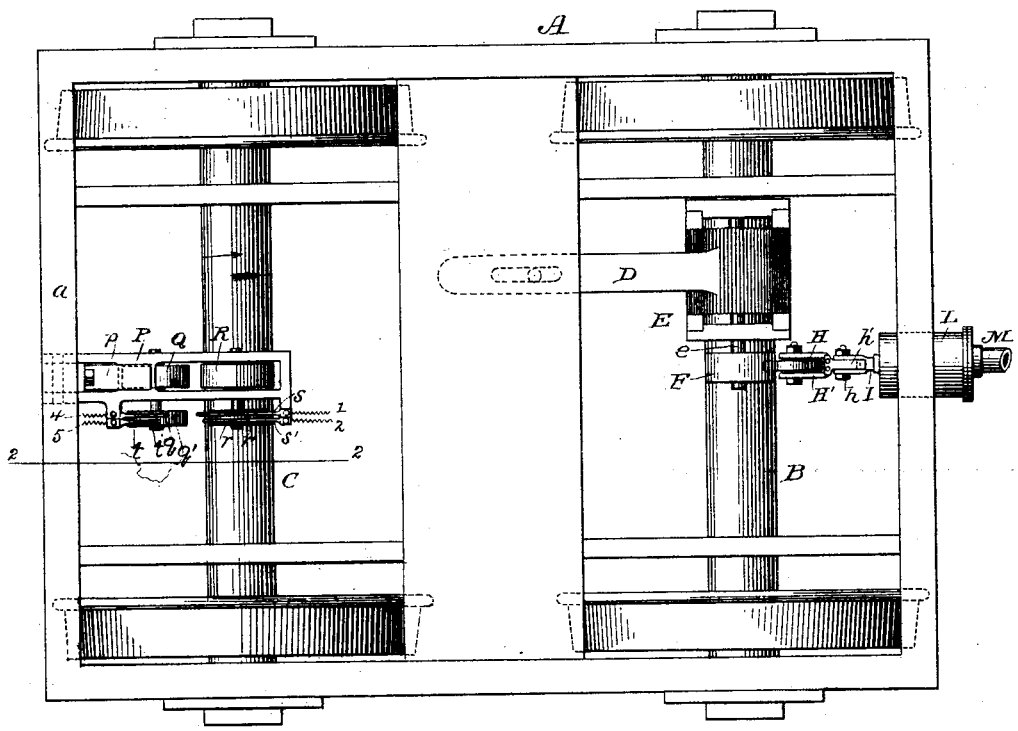
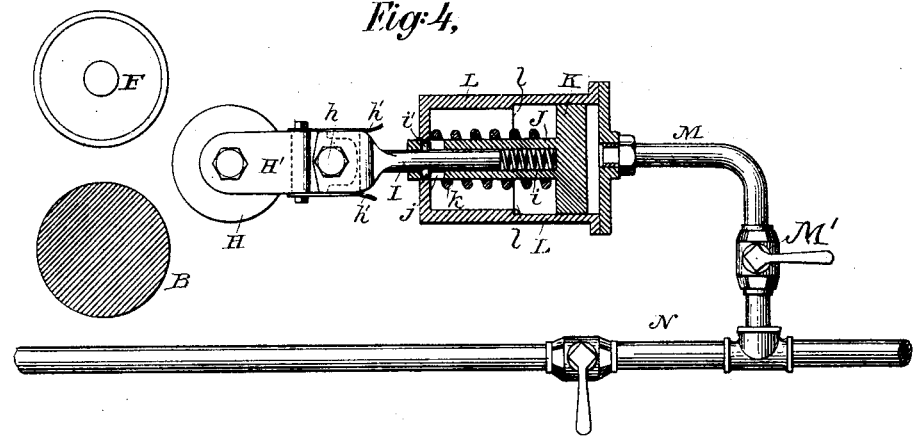
WITNESSES
Wm A. Skinkle
Ernest Abshagen
By his Attorneys
Baldwin, Hopkins & Peyton
INVENTOR
Eli T. Starr, (No Model.) 3 Sheets—Sheet 2.
E. T. STARR.
APPARATUS FOR PRODUCING SIGNALS AND LIGHTS UPON RAILWAY TRAINS.
No. 253,442. Patented Feb. 7, 1882.
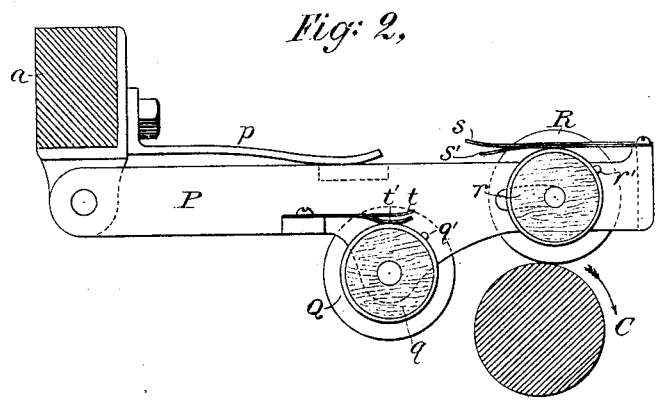
*Fig: 2.*
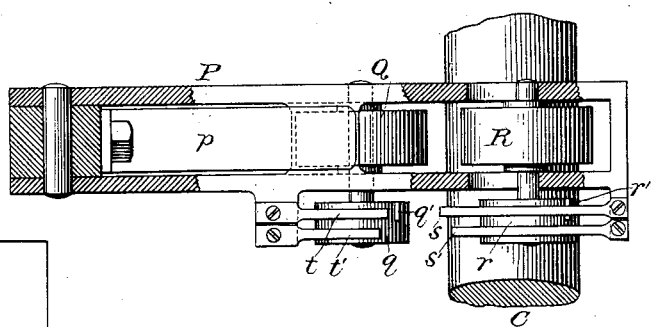
*Fig: 3.*
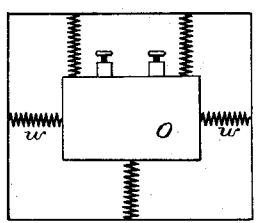
*Fig: 6.*
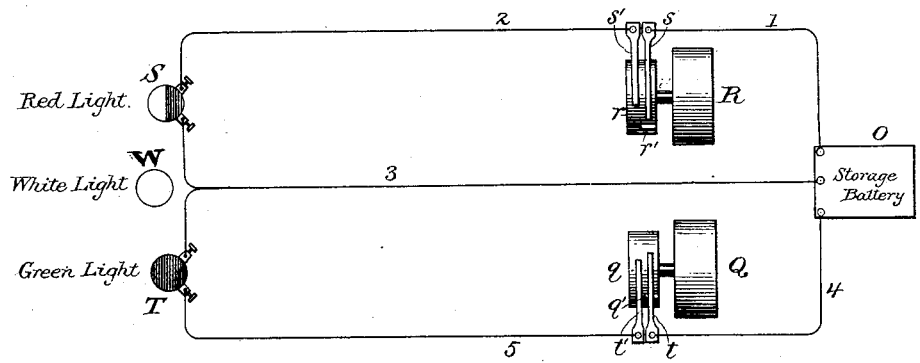
*Fig: 5.*
WITNESSES
Wm. A. Skinkle.
Ernest Abshagen.
INVENTOR
Eli T. Starr,
By his Attorneys
Baldwin, Hopkins & Peyton.

(No Model.) 3 Sheets—Sheet 3.
E. T. STARR.
APPARATUS FOR PRODUCING SIGNALS AND LIGHTS UPON RAILWAY TRAINS.
No. 253,442. Patented Feb. 7, 1882.
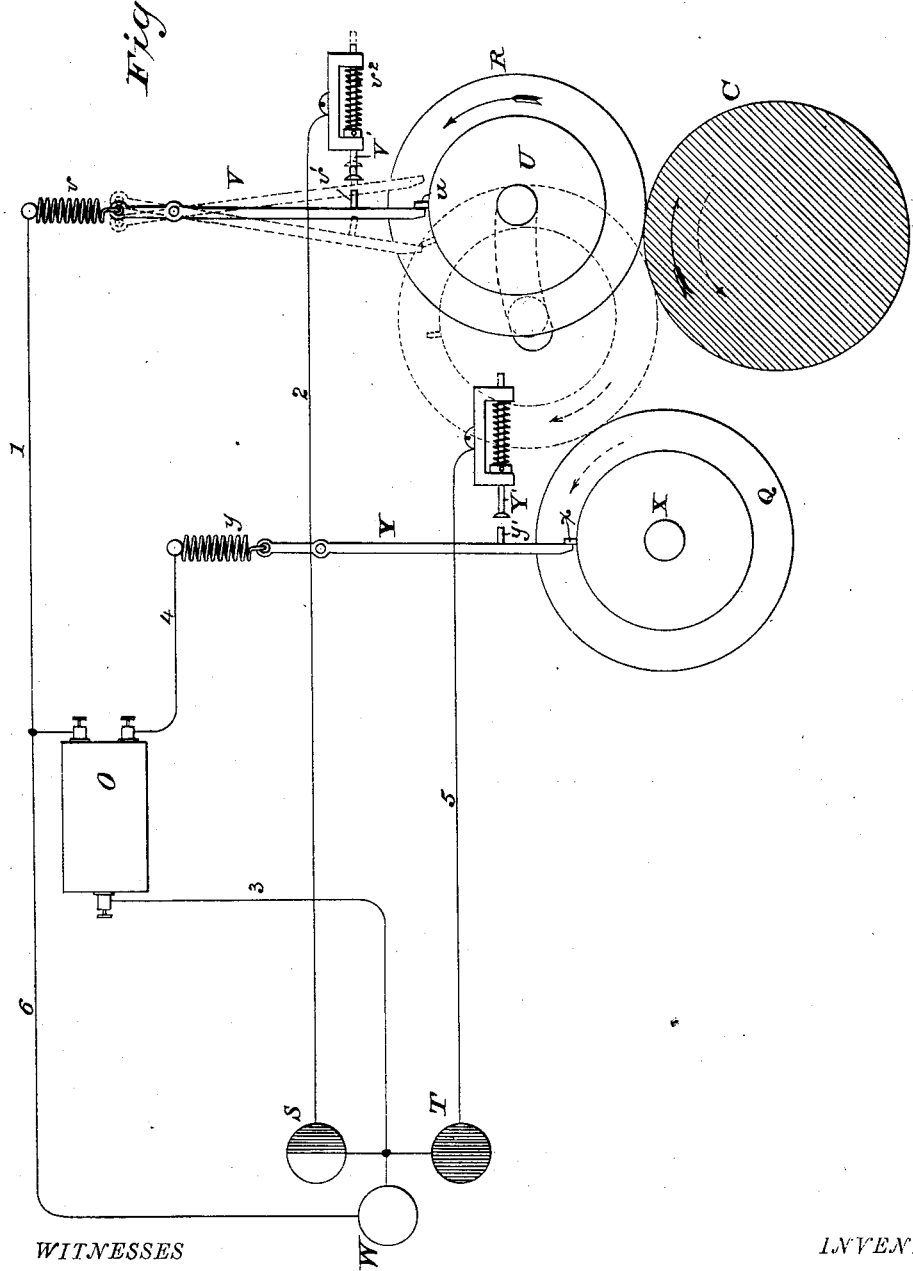
WITNESSES
INVENTOR
Eli T. Starr.
By his Attorneys

UNITED STATES PATENT OFFICE.

ELI T. STARR, OF PHILADELPHIA, PENNSYLVANIA.

APPARATUS FOR PRODUCING SIGNALS AND LIGHTS UPON RAILWAY-TRAINS.

SPECIFICATION forming part of Letters Patent No. 253,442, dated February 7, 1882.

Application filed November 19, 1881. (No model.)

*To all whom it may concern:*

Be it known that I, ELI T. STARR, of the city and county of Philadelphia, in the State of Pennsylvania, have invented certain new and useful Improvements in Electric Lighting Apparatus for Railway-Trains and other Moving Vehicles, of which the following is a specification.

In an application filed by me in the United States Patent Office on or about the 5th day of August, 1881, I have shown and described a practical method of and an organization of mechanism or devices for producing lights useful upon railway-trains and for analogous purposes. In my said application I have shown a dynamo-electric machine connected by a driving-connection with a revolving axle of one of the vehicles, so as to be driven by the motion of the train, to generate electric currents by which to charge a storage or secondary battery, whereby, through suitable circuit-connections under the control of the engineer, the electric current is conducted to an electric lamp at the front of the engine to produce an electric head-light for the locomotive, and to an electric lamp at the rear of the train to produce an electric light useful as a signal-light. By means of the secondary battery the light is kept up during the stoppages of the train. An automatic circuit-breaker forms part of the circuit between the rear or signal light and the secondary battery, so that during the motion of the train said signal-light will be a flash-light, or, in other words, will be an intermittent light, consisting of a continuous series of luminous electric flashes. By means of this signal-light at the rear of the train, organized to flash while the train is in motion, the engineer of an approaching train is enabled to tell whether the train bearing the signal is standing still or is in motion, and, if in motion, at what rate of speed it is moving.

The object of my present invention more especially is to improve the system of electric lighting for railway-trains or other moving carriages set forth in my said application.

The subject-matter claimed herein is particularly pointed out at the close of the specification.

In the accompanying drawings I have shown so much of an apparatus embodying or illustrating my present improvements as is necessary to an understanding of my invention. It will be understood, however, that some of my improvements, organizations, or combinations may be used without the others and in ways differing somewhat from that shown.

In said drawings, Figure 1 is a plan or top view of a car-truck fitted with parts of my improved apparatus. Fig. 2 is a sectional view therethrough on the line 2 2 of Fig. 1. Fig. 3 is a plan view of the circuit-breakers of a system of flashing or intermittent train-lights, and of an automatic switch arrangement for throwing one or another of the lights into action. Fig. 4 is a view, partly in section, of one organization of mechanism for connecting the dynamo-machine with an axle or moving part of the vehicle or train, so that the dynamo-machine may be driven when desirable or necessary. Fig. 5 is a diagram showing how the circuit-connections may be run between the storage-battery, circuit-breakers, switch, and lamps. Fig. 6 illustrates the storage or secondary battery as suspended by yielding connections, so as not to be injuriously disturbed by the motion of the vehicle or train. Fig. 7 is a diagram of a modified form of automatic circuit-breaking arrangement which may be substituted for the organization shown in Figs. 1, 2, 3, and 5.

In the drawings I have shown a truck, A, having two axles, B C, as usual. This truck is preferably the truck or one of the trucks of the tender of the locomotive.

I have deemed it unnecessary to show in the drawings a locomotive with its complete tender and a car or cars to make up a railway-train. Such a train is sufficiently shown in my aforesaid application of August 5, 1881, on which Letters Patent have been granted under date of December 13, 1881, as No. 250,764.

An adjustable bracket, beam, or support, D, is connected with the truck or its frame, and carries or supports a dynamo-electric machine, E, (of any suitable construction,) preferably directly over and a short distance from the forward axle, B, of the truck, as shown in Fig. 1. The armature or shaft *e* of said dynamo-machine E has a friction driving-wheel, F, firmly fastened thereon, and a rapid revolution is imparted to said wheel, and consequently to the

ferent colors—for instance, by green and red, respectively—so that each lamp will show a light differing from the other. The object of this series of lamps is to show at night—for instance, to the engineer of an approaching train—whether the train bearing the lights is moving forward or moving backward, and this is indicated by the exhibition of one kind of light or signal when the train is advancing and of another kind of light or signal when the train is backing.

Fig. 5 shows a diagram of a circuit arrangement leading from the storage-battery to the signal-lights at the rear of the train. Said storage-battery may be mounted upon the locomotive, as shown in my aforesaid application, and the circuit-connections be run from car to car by suitable couplings in ways well understood by skillful electricians. Circuit-breakers compose part of the circuits leading from the storage-battery to the signal-lamps, and an organization which may be employed I will now describe in detail.

An arm, P, is jointed to the rear cross-beam, $a$, of the tender-truck A, for example, and carries friction rollers or wheels Q R, upon the rotating shafts of which rollers are keyed or fixed circuit-breaking wheels $q$ $r$, having contact points or nibs $q'$ $r'$, respectively. One of said friction-rollers, Q, is stationary relatively to the arm P, and merely turns to rotate its shaft in its bearings to revolve the circuit-breaking wheel $q$, while the other, R, of said friction-rollers, which is in frictional engagement or contact with rear axle, C, of the truck, is capable not only of rotating with its shaft when driven by said axle to turn the circuit-breaking wheel $r$, but may move around said axle for a limited distance, inasmuch as the shaft of the said roller R is fitted to revolve in bearings formed by curved slots in the arm P, as clearly shown in Figs. 2 and 3, said slots being concentric with the axis of rotation of the axle C. A spring, $p$, presses against the top of the bar P and forces it downward so as to keep the wheel R in frictional contact with the axle, in order to be driven when the axle is in motion. The current passes from the storage-battery O to the lamp S, which gives the red light at the rear of the train, by way of the wire 1, contact-spring $s$, contact nib or point $r'$, circuit-breaking wheel $r$, contact-spring $s'$, and wire 2, and returns by way of the wire 3 to the battery. The current passes from the storage-battery to the lamp T, which gives the green light at the rear of the train, by way of the wire 4, contact-spring $t$, nib or contact-point $q'$, circuit-breaking wheel $q$, contact-spring $t'$, and wire 5, and returns by way of the wire 3 to the battery.

The contact-springs $s$ $s'$ are preferably secured to the arm P, and in the manner shown in Figs. 1, 2, and 3. The contact-spring $s'$ bears upon the conducting-periphery of the circuit-breaking wheel $r$, while the contact-spring $s$ is not in contact with said periphery, but makes contact with the nib or contact-point $r'$ of said wheel once for each complete rotation of said wheel, whereby the circuit is alternately made and broken by the circuit-breaker, and the result is as long as the axle C of the truck A revolves in a forward direction, as indicated by the arrow in Figs. 1 and 2, that an intermittent light is produced at the red lamp S, consisting of a continuous series of luminous electric flashes, which are very effective as a signal-light. The more rapid the rotation of the axle C and operation of the circuit-breaker the more rapid will be the electric flashes from the lamp, and consequently the rapidity of the flashes will be an index as to the speed of the train.

The contact-springs $t$ $t'$ are also preferably secured to the arm P, and in the manner shown in Figs. 1, 2, and 3. The contact-spring $t'$ bears upon the conducting-periphery of the circuit-breaking wheel $q$, while the contact-spring $t$ is not in contact with said periphery, but makes contact with the nib or contact-point $q'$ of said wheel once for each complete rotation of said wheel.

It will be obvious that while the train is moving forward only the red light will be exhibited, inasmuch as the rotation of the axle C in a forward direction will carry the friction-wheel R upward and outward to the extreme limit of the concentric slots in which the shaft of said wheel has its bearings, and will rotate the circuit-breaker of the red light only, whereby the friction-wheel R will be disengaged or out of gear with the friction-wheel Q, and said wheel Q and its circuit-breaker will consequently be at rest and the circuit, including the green light, broken, so that no current can flow to the lamp T. When, however, the train is moving backward the red light will be automatically switched out and the green light will be exhibited, and this will be due to the fact that by the backward rotation of the axle C the friction-wheel R will be carried backward and downward to make a gear-connection between the axle C and the friction-wheel Q, to rotate said wheel Q and operate its circuit-breaker to alternately make and break the circuit, and thus produce at the green lamp an intermittent light, consisting of a continuous series of luminous electric flashes, while at the same time the circuit-breaking wheel $r$ will be drawn away from the contact-springs $s$ $s'$, which will open the circuit in which the red lamp is situated, and thereby prevent the flow of current to said lamp. As in the case of the red light with respect to speed, so it is with the green light, and the rapidity of the electric flashes from the green lamp will indicate the speed at which the train is moving backward.

I contemplate when the train is at rest that neither of the before-described signal-lights shall be exhibited, but that a pure or white electric light, W, shall be shown. I have deemed it unnecessary in Fig. 5 to show a circuit-connection leading from the battery to the white light W, as such will readily be suggested to skillful electricians, and, moreover, is shown in Fig. 7. If desired, the white light may be a constant light, exhibited at the same time with the light indicating forward motion of the train and with the light indicating backward motion of the train; or it may be exhibited alone when the train is stationary by the switching or cutting out of the said lights which indicate the motions of the train. Instead, however, of the white light being an electric light, it may be the light of an ordinary lamp, such as those in common use, hung at the rear of the train. An electric light, however, is preferred.

It is possible for one or both of the circuit-breaking wheels $q\ r$ of the organization shown in Figs. 1, 2, 3, and 5 to come to rest in circuit, so as to exhibit constant or uninterrupted lights at the signal-lamps S T when the train or vehicle is not in motion; but the light or lights, however, would not be flash-lights.

In order to provide an organization in which the signal-lights which show the motion of the vehicle or train cannot by chance be exhibited when the train or vehicle is at rest or not in motion, I have devised the circuit-breaking arrangement shown in Fig. 7, a description of which is as follows:

In place of the circuit-breaking wheel $r$ and springs $s\ s'$, the shaft of the friction-roller R, which rotates in the curved slot when driven by the axle C, may carry a wheel, U, having a lug or projection, $u$, which, when the axle is rotating in a forward direction, will operate, once for each complete rotation of the wheel U, a pendulum or pivoted lever, V, acted upon by a spring, $v$, so that when said lever is carried out of the perpendicular, as shown in dotted lines, and released it will swing back beyond the perpendicular, as also shown in dotted lines, and make contact by its contact-point $v'$ with the contact-piece V', and thus close the circuit to give out a flash at the red lamp S. After the contact is made, which is prolonged by the aid of the spring $v^2$, encircling the endwise-movable contact-piece V', the circuit of the red lamp S is broken by the lever V assuming a perpendicular position, due to gravity, aided by the action of the spring $v$ on the lever. The current from the storage-battery O passes to the lamp S by way of wire 1, spring $v$, lever V, contact-point $v'$, contact-piece V', and wire 2, and returns to the battery by way of wire 3.

In place of the circuit-breaking wheel $q$ and springs $t\ t'$, the shaft of the friction-roller Q in Fig. 7 carries a wheel, X, having a lug, $x$, on its periphery, which, when the train or vehicle is moving backward and a gear-connection is formed between the roller Q and the axle C by the roller R, operates the circuit-breaking lever Y to make and break the electric circuit of the green lamp T in the same way as the make and break is effected in the circuit of the lamp S by the lever V. The current from the storage-battery passes to the lamp T by way of wire 4, spring $y$, lever Y, contact-point $y'$, yielding contact-piece Y', and wire 5, and returns to the battery by way of wire 3. The current passes from the battery to the white light W in Fig. 7 by way of wire 6, and returns to the battery by way of wire 3.

It will be understood from what has been said that by the automatic cutting out of the lamps S T, which exhibit the signals indicating motion of the vehicle or train, only the lamp W (which exhibits the white light) will give out its light, whereby it will be made evident by a distinctive signal that the vehicle or train is at rest.

Forms of circuit-breakers other than those described for use in the circuit of the signal-lamps will suggest themselves to skillful electricians and mechanicians for carrying out my invention.

I also contemplate a switch arrangement forming part of the circuit between the storage-battery and signal-lamps under the control of the engineer, as described in my aforesaid application, by which the lamps may be connected in circuit with or disconnected from the battery at the proper times.

In Fig. 6 I have shown the storage-battery as suspended and supported by yielding connections, (shown in this instance as spiral springs $w$,) which give the battery a yielding capacity to overcome injurious action which might otherwise be occasioned by the jars and motions of the locomotive or truck which carries it.

I do not claim in this application the method of working a dynamo-electric machine so as to throw it into action at will, to be driven by the vehicle or train, nor the mechanism for this purpose hereinbefore described, as this part of my invention will constitute the subject-matter of another application. This application is restricted to the improvements in the organization and combinations of mechanism and devices for producing the lights particularly useful for signaling hereinbefore set forth.

I claim as of my invention—

1. The combination, substantially as hereinbefore set forth, of a vehicle or train of vehicles, a rotating axle or moving part of said vehicle or train, an electric circuit including a source of electricity mounted upon said vehicle or train, an electric lamp, and mechanism operated by said axle or moving part, whereby said axle, when turning in one direction, throws said lamp into circuit to give out light, while when turning in the opposite direction said lamp is thrown out of circuit.

2. The combination, substantially as hereinbefore set forth, of a vehicle or train of vehicles, an axle or moving part of said vehicle or train, a source of electric supply mounted upon said vehicle or train, electric lamps, circuit-connections between said electric source and said lamps, and mechanism operated by the movement of said axle or moving part of the vehicle or train, so as to throw one of said lamps into action during the rotation of said axle in one direction, and another of said lamps into action during the rotation of the axle in the opposite direction.

3. The combination, substantially as hereinbefore set forth, of a vehicle or train of vehicles, a source of electricity mounted upon said vehicle or train, two circuits including said source, and a switch automatically operated by the movement of said vehicle or train to close one of said circuits when the vehicle or train is advancing and to close the other of said circuits when said vehicle or train is backing.

4. The combination, substantially as hereinbefore set forth, of a vehicle or train of vehicles, an axle or rotating part of said vehicle or train, electric lamps to indicate the direction of travel of said vehicle or train, circuit-connections including said lamps and a source of electricity mounted on said vehicle or train, mechanism operated by the movement of said axle so as to throw one of said lamps into action during the rotation of said axle in one direction and another of said lamps into action during the rotation of the axle in the opposite direction, and a third lamp to indicate when the vehicle is at rest.

5. The combination, substantially as hereinbefore set forth, of an axle or rotating part of a vehicle, an arm carrying friction-wheels journaled therein, so as to be driven by the revolution of said axle, circuit-connections including electric lamps and a source of electricity, and circuit-breaking wheels turned by said friction-wheels to make and break said circuit-connections.

6. The combination, substantially as hereinbefore set forth, of an axle or rotating part, a hanging arm, a roller journaled in said arm so as to rotate a circuit-breaker to make and break an electric circuit, a second roller journaled in said arm so as to be driven by said axle and capable of being moved into and out of contact with said first-mentioned roller, and a circuit-breaker rotated by said second roller to make and break an electric circuit.

In testimony whereof I have hereunto subscribed my name this 7th day of November, A. D. 1881.

ELI T. STARR.

Witnesses:
 SAMUEL E. STARR,
 JOHN URIAN.